US005368824A

United States Patent [19]

Nell et al.

[11] Patent Number: 5,368,824

[45] Date of Patent: Nov. 29, 1994

[54] GAS DISTRIBUTION SYSTEM FOR FLUIDIZED BED REACTORS

[75] Inventors: David J. Nell, Oradell, N.J.; Frederick A. Zenz, Garrison, N.Y.

[73] Assignee: Marquess and Nell Inc., New York, N.Y.

[21] Appl. No.: 108,485

[22] Filed: Aug. 18, 1993

[51] Int. Cl.$^5$ .......................... F27B 15/10; B01J 8/18; B01J 8/44

[52] U.S. Cl. .................................... 422/143; 110/245; 122/6.6; 422/139; 422/311; 432/58; 34/368; 34/582; 34/586

[58] Field of Search ................ 422/139, 143; 165/311, 165/104.16; 34/57 A, 10, 57 B, 57 R; 122/4 D, 6.6; 110/245; 432/58

[56] References Cited

U.S. PATENT DOCUMENTS

| | | | |
|---|---|---|---|
| 3,912,460 | 10/1975 | McGann | 422/143 |
| 4,392,943 | 7/1983 | Euzen et al. | 34/57 A X |
| 4,443,551 | 4/1984 | Lionetti et al. | 422/143 X |
| 4,478,707 | 10/1984 | Bischoff et al. | 422/143 |
| 4,843,050 | 6/1989 | Rahlwes et al. | 422/310 X |

*Primary Examiner*—Amalia L. Santiago
*Attorney, Agent, or Firm*—William P. Keegan

[57] ABSTRACT

A gas distribution system employing an array of parallel gas inlet pipes and a pair of transverse gas inlet pipes located below the first group of pipes to fluidize a particulate bed in a reaction vessel and to remove non-fluidizable particles that may be introduced into or form in the bed.

6 Claims, 5 Drawing Sheets

GAS DISTRIBUTION SYSTEM FOR FLUIDIZED BED REACTORS

FIELD OF THE INVENTION

This invention relates to a gas distribution system for introducing a fluidizing gas into the particulate bed of a fluidized bed reactor, and for periodically or continuously removing, while the reactor is in full operation, agglomerates, gangue, or incombustible materials that accumulate in the bed.

BACKGROUND OF THE INVENTION

The disposal of streams of waste material is often accomplished in fluidized bed reactors by injecting a waste stream into a fluidized bed of inert particulate material, e.g., beach sand or the like, and burning or incinerating the waste material. Beds made up of such materials provide an enormous surface area for the efficient transfer of heat from the bed particles to the waste material which coats the particles, thereby facilitating the incineration of the waste material. The fluidized bed particles may be kept at the operating temperature for the incineration process by the heat released solely from the combustion reaction between the oxygen in the bed fluidizing gas and the combustible matter in the waste stream. This may be augmented by a gaseous or liquid fuel separately introduced into the bed. The technology for such incineration of waste material is well known and has been practiced in the process industries for many years. For example, it has been utilized for the incineration of waste uranyl nitrate solutions, the disposal of black liquor from paper mills, miscellaneous sludges from petroleum refineries, pharmaceutical plants, and sewage concentrators.

In all of the various forms os such fluidized bed combustors it is imperative that the fluidizing gas be uniformly distributed across the bed area, that the bed material be of such small size that it is fluidized at all times, and that bed particles that become enlarged over time by accretion of non-combustibles in the waste stream be periodically or continuously removed from the bed without requiring that the combustor be shut down.

The precise composition of a waste stream is frequently unknown. This is particularly the case in sewer sludges in which the non-combustible constituents thereof can result in the formation of sticky eutectic mixtures when subjected to the combustion temperatures. Such sticky mixtures can, by adhesion to the bed particles, cause them to grow in size by accumulating layer upon layer of accretions. When such enlarged solids, or agglomerates of the sticky mixtures, reach such a size that they can no longer be sustained in the fluidized state by the fluidizing gas, they sink to the bottom of the bed and lay there as an immobile fixed bed. This then distorts the uniform distribution of the fluidizing gas across the bed area and thereby progressively decreases the efficiency of the combustor. If allowed to progress unchecked, the combustor becomes totally inoperative. Tramp materials in the feed to the bed also result in this undesirable effect. It is therefore of the greatest importance that such oversize components be effectively removed from the bed as expeditiously as possible.

Similar situations arise in fluid beds burning many other materials. For example, many installations burning coal or biomass materials experience operating problems caused by stones in the feed.

In the past, the removal of oversize components from the bottom of a fluidized bed has been accomplished by gently sloping an air distribution grid in a downward direction towards a discharge port in the grid or towards a discharge chute in the wall of the reactor or combustor. With such an arrangement of the grid the mobility of particles within the fluidized bed permits coarser or heavier particles on the grid to migrate towards the discharge port or chute under the grid. Such mobility is primarily dependent on the shape and weight of the solid particles or agglomerates desired to be removed, the superficial velocity of the fluidizing gas, and the slope or grade of the grid in the direction of the discharge port. U.S. Pat. No. 4,253,824 discloses a dual cone distributor grid for removing tramp material together with admixed bed particles from a fluidized bed reactor.

Another means for removing foreign objects, tramp material, oversized inert or otherwise non-combustible material from a fluidized bed is disclosed in U.S. Pat. No. 4,908,124. In this patent, the distributor grid supporting the bed particles is configured to provide a lateral vector of fluidizing gas that urges any oversize objects that have descended to the bottom of the fluidized bed towards a discharge port in the side of the reactor, thereby obviating the need for a sloping distributor grid. U.S. Pat. Nos. 4,421,023 and 4,196,676 also show distributor grids that give the fluidizing gas a lateral vector which tends to move oversize particles at the bottom of the fluidized bed towards a discharge port.

Many of these designs are of a complicated mechanical construction which on heat up or cool down become stressed and eventually fail due to differential thermal expansion of the components.

SUMMARY OF THE INVENTION

The object of the present invention is to provide an improved gas distribution system that introduces the bed fluidizing gas into a reactor bed in a way that moves large non-fluidizable bed particles or agglomerates across the bottom of the bed towards a discharge port or chute whereby such agglomerates are removed from the bed periodically, or on a continuous basis when the rate of formation of the agglomerates so requires, and to accomplish this in a structure which is free from stresses caused by differential expansion of the components thereof.

In carrying out the invention, a gas distributor is provided having a plurality of spaced apart pipes or tuyeres arranged in a parallel configuration across the area of the bed and located a distance above the floor supporting the bed. Each pipe is provided with two rows of apertures near the bottom of the pipe through which the fluidizing gas is fed into the bed. The apertures are directionally oriented so that the fluidizing gas is directed towards a centerline of the bed that is transverse to the longitudinal axis of the pipes. Below the fluidizing gas pipes and just above the bed supporting floor two additional spaced apart pipes are provided. They are arranged with their longitudinal axes transverse to the longitudinal axes of the fluidizing gas pipes, and they are located with the aforesaid centerline midway between them. Each of these latter two pipes is provided with a single row of apertures directed downwardly towards the bed supporting floor and the aforesaid centerline and towards the ends of the pipes where a discharge chute is provided between the two pipes. A gas is periodically or continuously fed to these latter two pipes to fluidize the bed particles located in the channel formed between the two pipes and the bed particles immediately thereabove. The arrangement is such that large particles formed by agglomeration or accretion in the bed sink to the level of the apertures in the fluidizing gas pipes along the aforesaid centerline of the bed at which point they are propelled towards the discharge chute by the directionally oriented jets of fluidizing gas from the lower two pipes.

The construction of the gas distribution system using a series of parallel pipes is such that thermal expansion effects are easily accommodated. The only expansion of consequence is longitudinally along the axes of the pipes, and provision is made for this expansion to take place without excessive stress on the components by allowing the ends of the pipes to slide freely on supports as the pipes expand lengthwise.

Features and advantages of the invention may be gained from the foregoing and from the description of a preferred embodiment of the invention which follows.

DETAILED DESCRIPTION OF THE INVENTION

Figure 1:
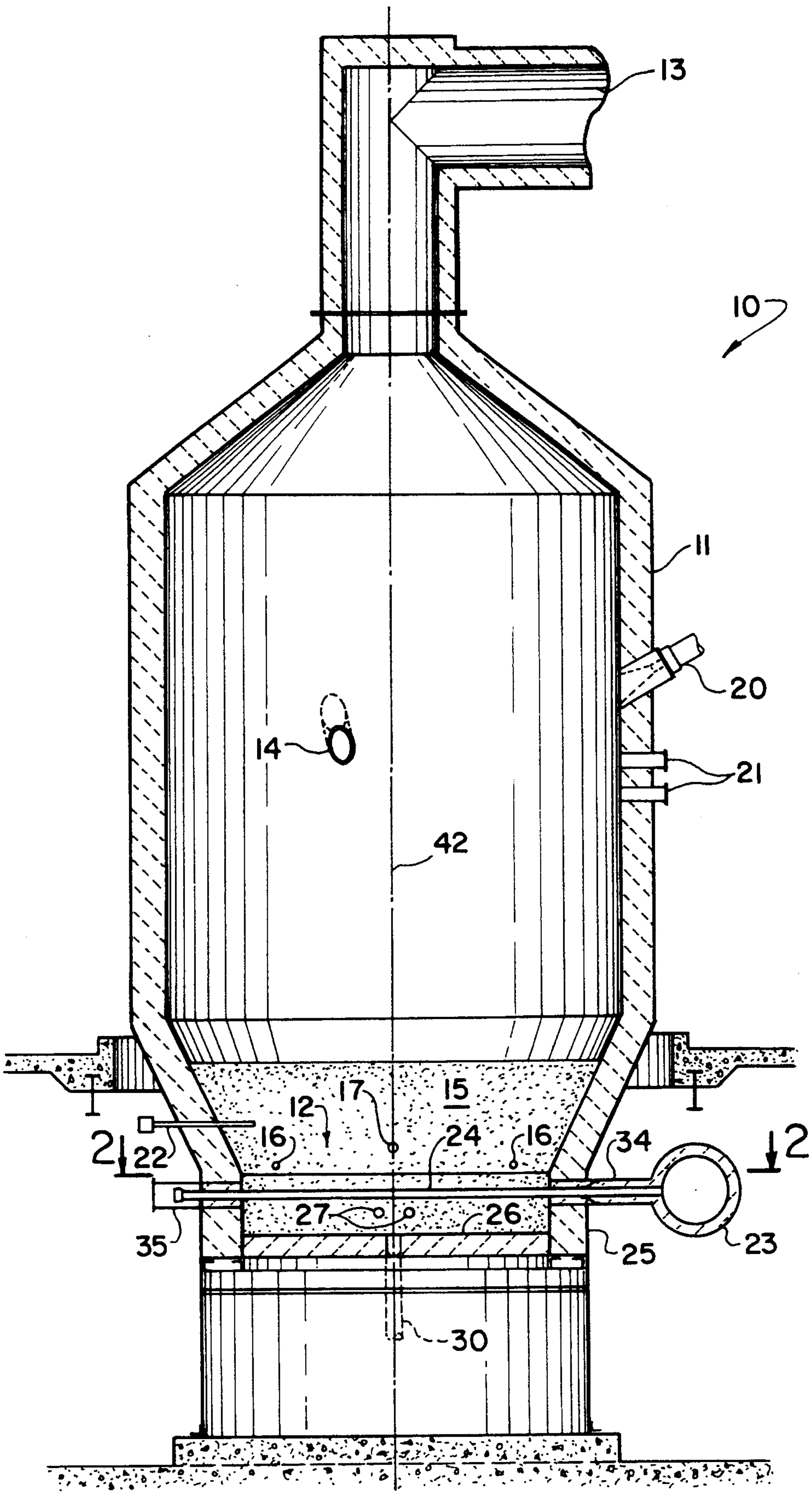
FIG. 1 is an elevational view, partly in section and with certain components schematically shown, of a fluidized bed sewage sludge incinerator.

Referring to FIG. 1 of the drawing, a sewage sludge incinerator 10 is shown as comprising a combustor vessel 11 of generally cylindrical construction having a gas distribution grid 12 for feeding a supply of gas to fluidize a bed 15 of inert non-combustible granular particles at its lower end and an outlet port 13 for the incinerator exhaust at its upper end. The exhaust stream from the incinerator is directed to a heat exchanger that pre-heats the fluidizing gas before it is introduced into bed 15 and then to scrubbers, precipitators, cyclones, and other filtering devices before it is vented to the atmosphere. Since such devices form no part of the present invention they are not shown in the drawing or described in this specification. Likewise, the delivery systems for feeding bed particles, sewage sludge, fuel, and fluidizing gas to incinerator 10 are not shown or described.

Incinerator 10 is provided with a fill pipe 14 through which a supply of bed particles is fed into vessel 11 to maintain the bed 15 at its desired operating level. The bed particles will be any granular material suitable for carrying out the particular process for which vessel 11 is provided. In the case of a sewage sludge incinerator, which is the type of reactor being described in this specification, sand would be a suitable bed material since the sand particles provide a large inert surface area that can be coated by the sludge that is to be incinerated. Just above the level of gas distributor grid 12 a plurality of sludge inlets 16 are spaced around the periphery of vessel 11 for feeding sewage sludge into bed 15 of sand particles. Other inlets 17 may be provided for separately feeding grease into bed 15.

A series of overhead fuel burners 20, preferably natural gas burners, are located around the periphery of vessel 11 above the upper level of bed 15. They are provided to preheat bed 15 prior to the introduction of sewage sludge into the bed and to raise the temperature of the bed to a point where the sludge will burn when introduced into the bed. Air for combustion of the fuel fed to the incinerator by burners 20 is fed into vessel 11 through air inlets 21 located adjacent to burners 20.

A plurality of fuel oil gun ports 22 are also spaced around the periphery of vessel 11 for feeding fuel oil directly into bed 15 to support the combustion process. Other fuels, such as natural gas, may be fed into the bed through ports 22.

Figure 3:
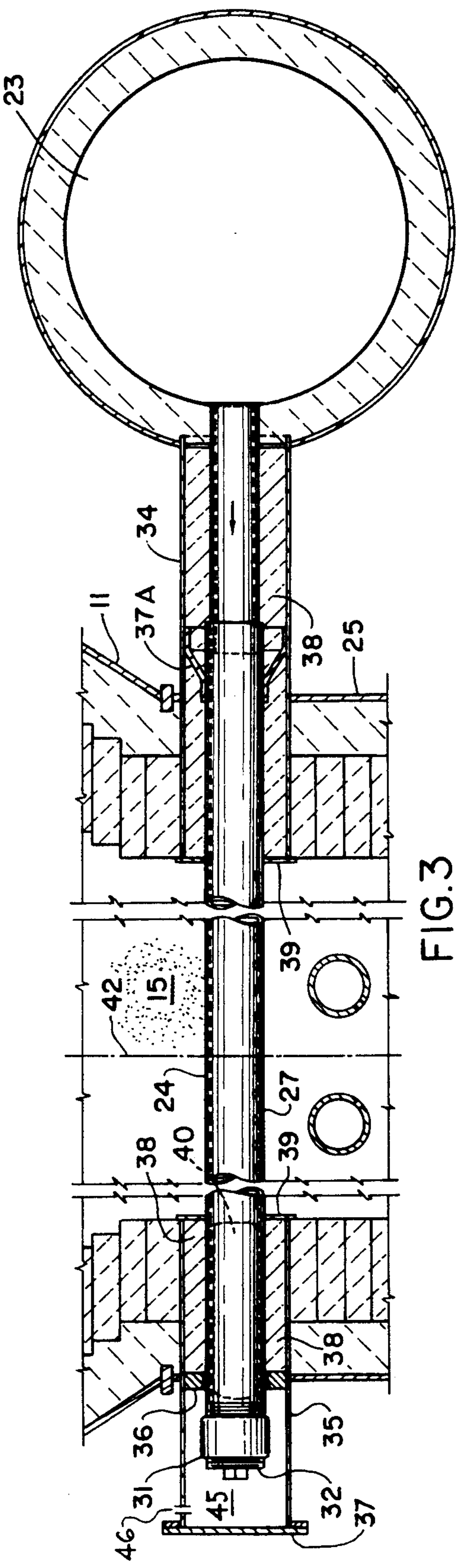
FIG. 3 is a sectional view taken along line 3—3 of FIG. 2.
Figure 4:
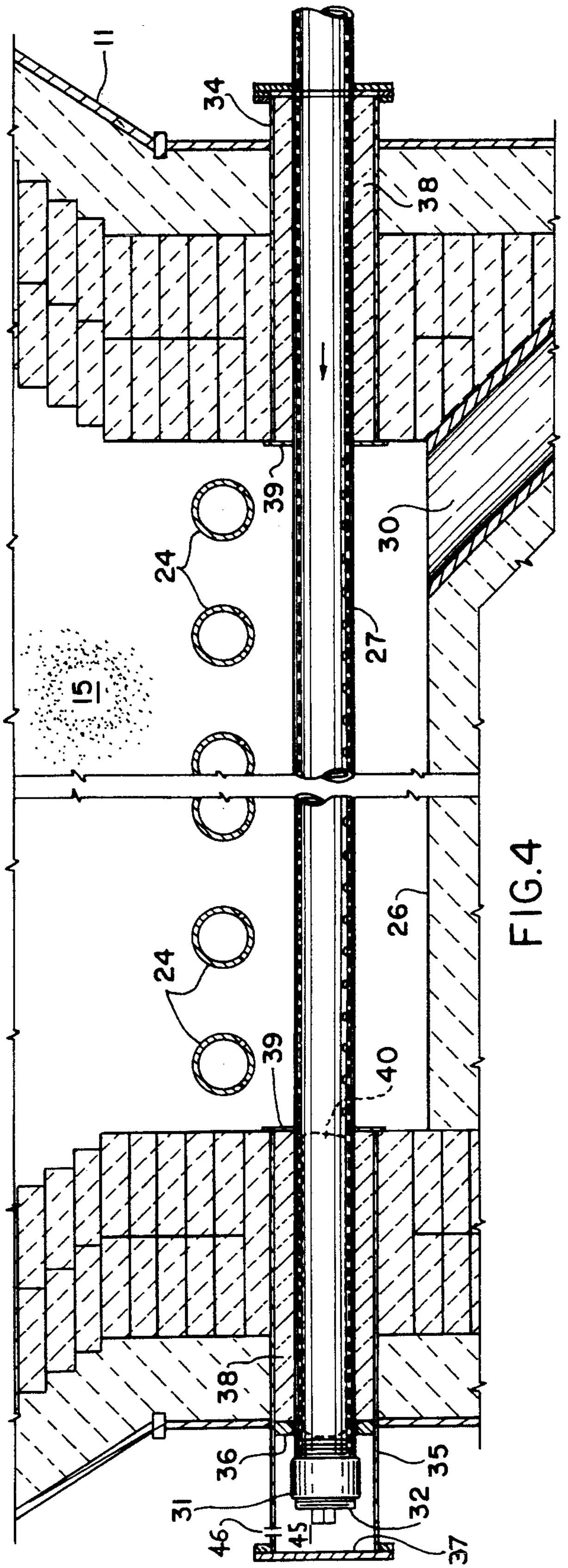
FIG. 4 is a sectional view taken along line 4—4 of FIG. 2.
Figure 5:
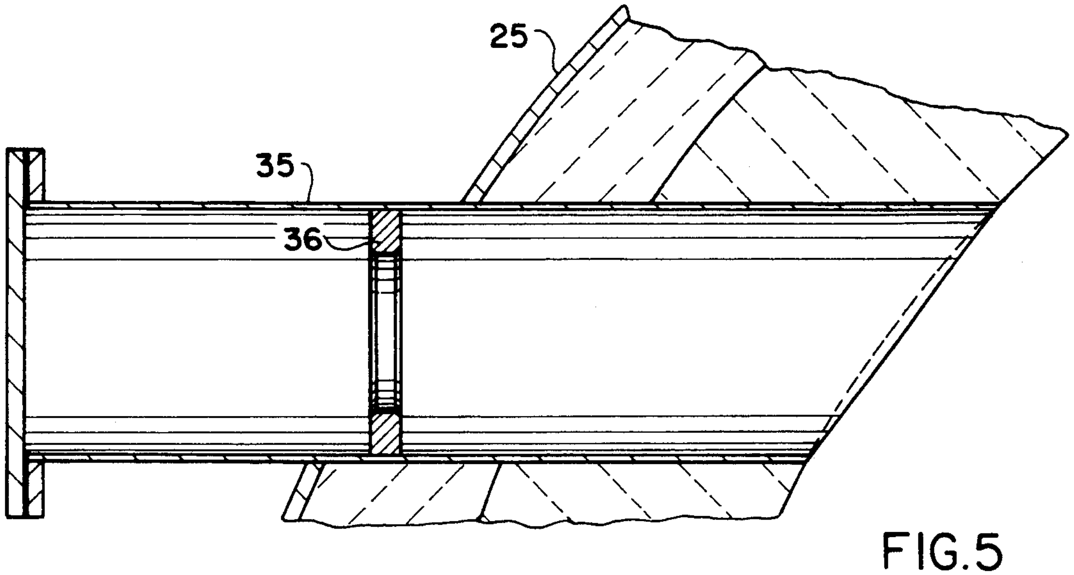
FIG. 5 is a fragmentary sectional plan view showing the tuyere support means.
Figure 2:
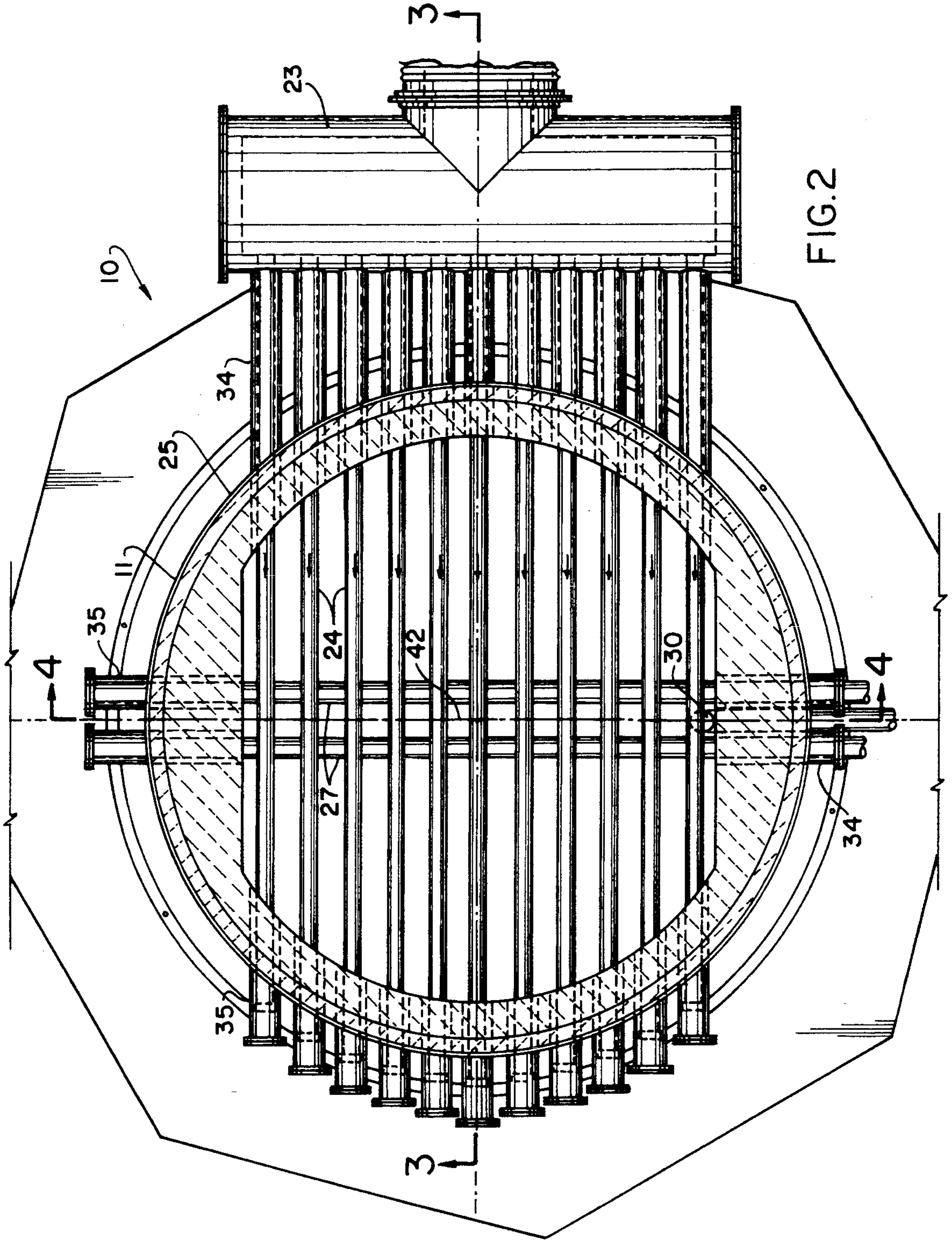
FIG. 2 is a sectional plan view of the sewage sludge incinerator showing the fluidizing gas distribution and agglomerate removal system.

Attention is now directed to FIGS. 2, 3, and 4 wherein the fluidizing gas and agglomerate removal system is shown in detail. In incinerator 10 the fluidizing gas is pre-heated air and it is delivered from a blower and pre-heater (not shown) to manifold 23. Connected to manifold 23 are a plurality of pipes or tuyeres 24 that extend transversely across the lower part of combustor vessel 11 from the manifold through wall 25 of vessel 11 and out the section of wall 25 opposite the manifold. Tuyeres 24 are spaced apart as shown in FIG. 2 and effectively cover the full cross sectional area of vessel 11 that will contain the bed 15 of particles to be fluidized. Tuyeres 24 are spaced some distance above floor 26 of vessel 11, and in that space an additional pair of spaced apart tuyeres 27 are provided. These additional tuyeres are positioned transversely to tuyeres 24 and they may be supplied from a source of air other than manifold 23. An agglomerate discharge port 30 through which agglomerates are removed from bed 15 is provided in floor 26 below tuyeres 27.

The air that is delivered to manifold 23 and tuyeres 24 is pre-heated since in addition to fluidizing bed 15 it also helps in the burning of the sewage sludge fed into bed 15. The air delivered to tuyeres 27 need not be preheated since sludge is not fed to that part of bed 15 which is fluidized by the air delivered to tuyeres 27. That part of bed 15 is fluidized only to move agglomerated material that settles therein to discharge port 30, and so it may only be fluidized intermittently as when agglomerates form at a slow rate and only have to be removed at intervals. However, if the agglomerates are to be removed continuously, as by feeding air to tuyeres 27 continuously, and it is desired to heat such air so as not to introduce relatively cool air into the combustion chamber, tuyeres 27 may be supplied with air from manifold 23.

Tuyeres 24 and 27 are simply thick wall pipes in which air holes are drilled as will hereinafter be described. The ends of the tuyeres remote from the ends to which air is delivered are closed by pipe couplings 31 and pipe plugs 32 as shown in FIGS. 3 and 4.

It is noted that the openings in vessel wall 25 through which tuyeres 24 and 27 pass are provided with pipe sleeves 34 and 35 which are of a greater diameter than that of the tuyeres. The closed ends of tuyeres 24 and 27 are supported on ring members 36 that allow the tuyeres to slide freely thereon. Such sliding movement occurs due to the thermal expansion of the tuyeres, especially tuyeres 24, when incinerator 10 is brought up to operating temperatures. Due to the particular construction of the gas distribution system disclosed, essentially all expansion and contraction of the gas distribution grid on heat up and cool down of the incinerator occurs as a longitudinal movement of the tuyeres. The outer ends of sleeves 35 are closed by plates 37, so the ends of the tuyeres slide into a closed chamber 45 which is kept free of particles by the constant admission of purge air through inlets 46. If it were not for this purge air,chamber 45 would soon fill with particles leaking into the chamber from bed 15, and free movement of the tuyeres would be inhibited.

The annular spaces between the tuyeres and their respective sleeves are filled with insulating material 38 which is kept in place by retaining rings 39 that are tack welded to the inner ends of the sleeves. A ceramic fiber plug 40 is placed in the remote end of each tuyere where the tuyere passes through vessel wall 25 as it exits the combustion chamber of the incinerator.

Figure 6:
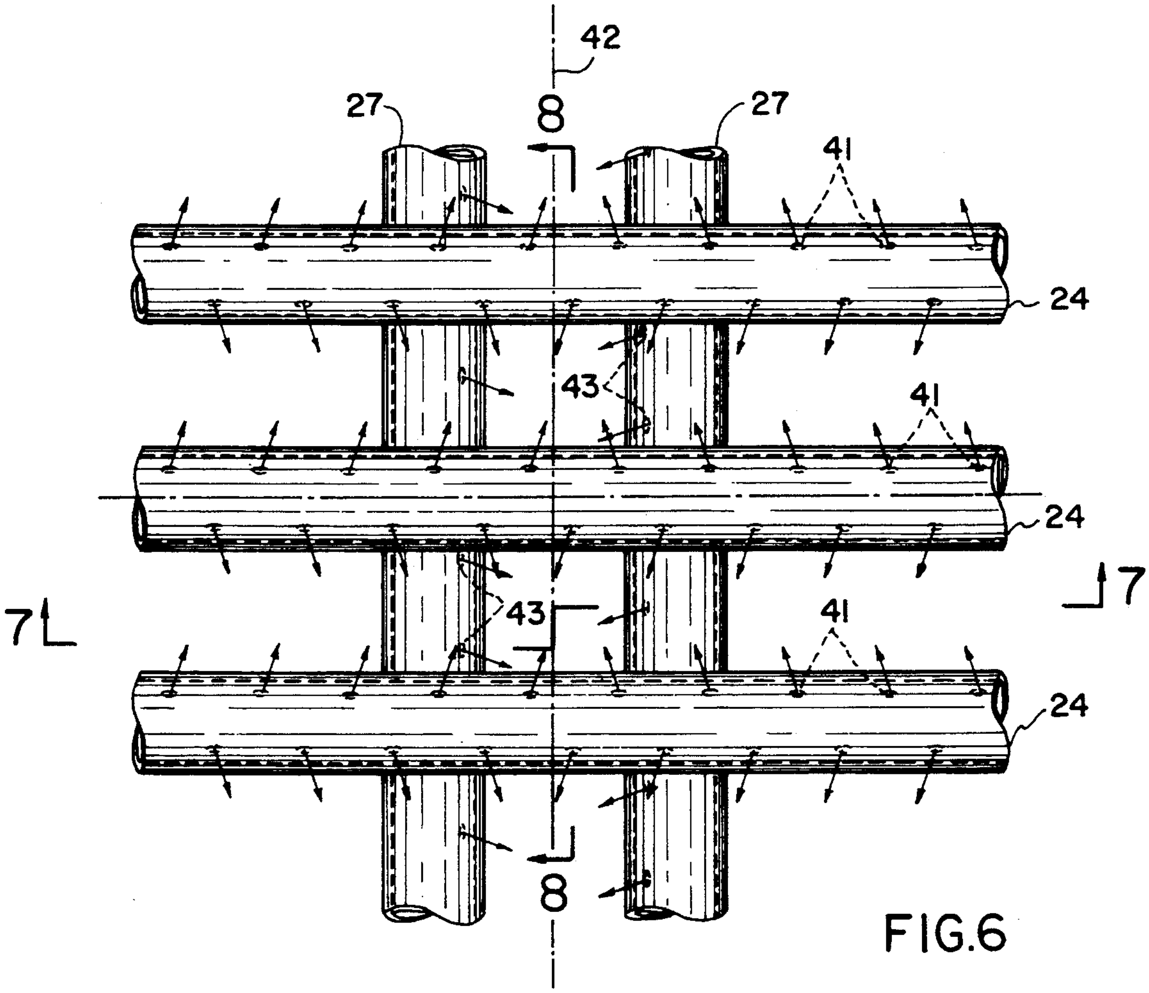
FIG. 6 is a partial plan view of the gas distribution and agglomerate removal system tuyeres showing the direction of gas flow from the tuyeres.
Figure 9:
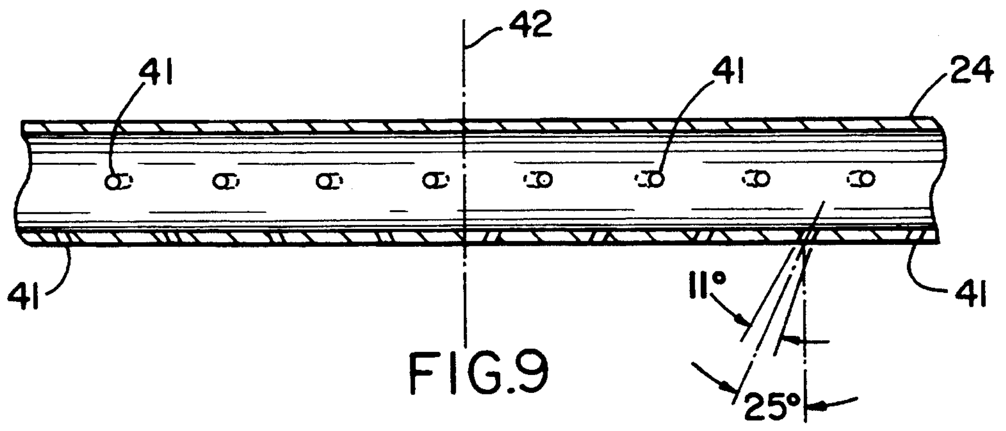
FIG. 9 is a fragmentary sectional view of a tuyere taken along line 9—9 of FIG. 7 showing the directional orientation of the tuyere apertures.

FIGS. 6 to 9 show the configuration of the air holes in tuyeres 24 and 27. Each tuyere 24 is provided with two rows of staggered air holes 41 located as shown. The holes are oriented to deliver the fluidizing air (as represented by the arrows drawn from each air hole) towards the centerline of the incinerator. Thus, as shown in FIG. 6, the air holes to the left of the centerline, as indicated by the reference character 42, are aimed rightwardly towards the centerline while the air holes to the right of the centerline are aimed leftwardly towards the centerline. It might be noted that the tuyeres are five inch pipes with a one half inch wall so the jets of fluidizing air that emanate from the holes will have a definite directional orientation. In FIG. 9 the air holes are shown oriented twenty five degrees in the desired direction, i.e., twenty five degrees to a cross sectional plane passing transversely through a tuyere, and each air hole is flared eleven degrees from the inside to the outside of the tuyere.

Each tuyere 27 is provided with a single row of air holes 43 located as shown and all oriented towards discharge port 30. The individual air holes in tuyeres 27 are of the same configuration as those shown in FIG. 9 for the air holes in tuyeres 24.

Figure 7:
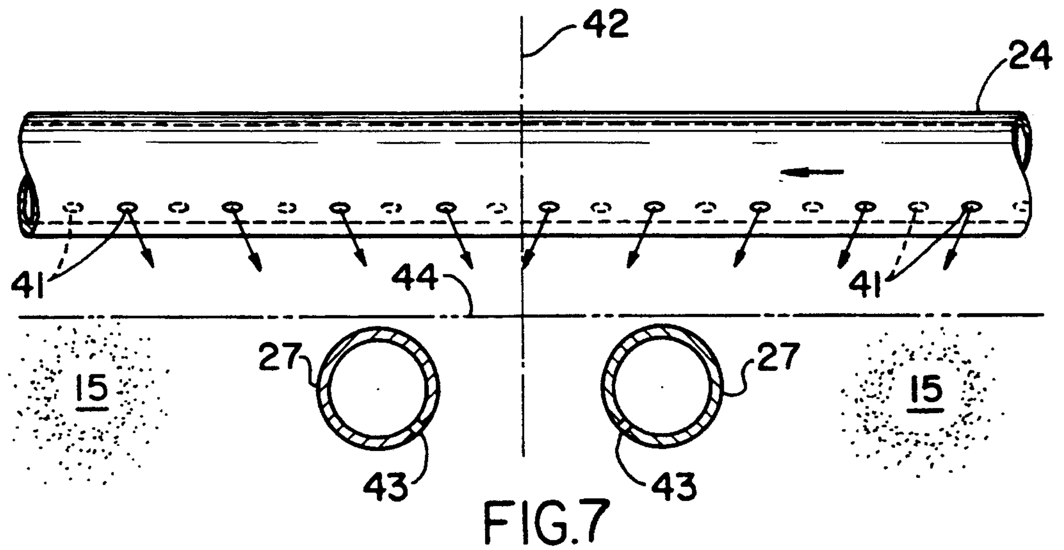
FIG. 7 is a sectional view taken along line 7—7 of FIG. 5.
Figure 8:
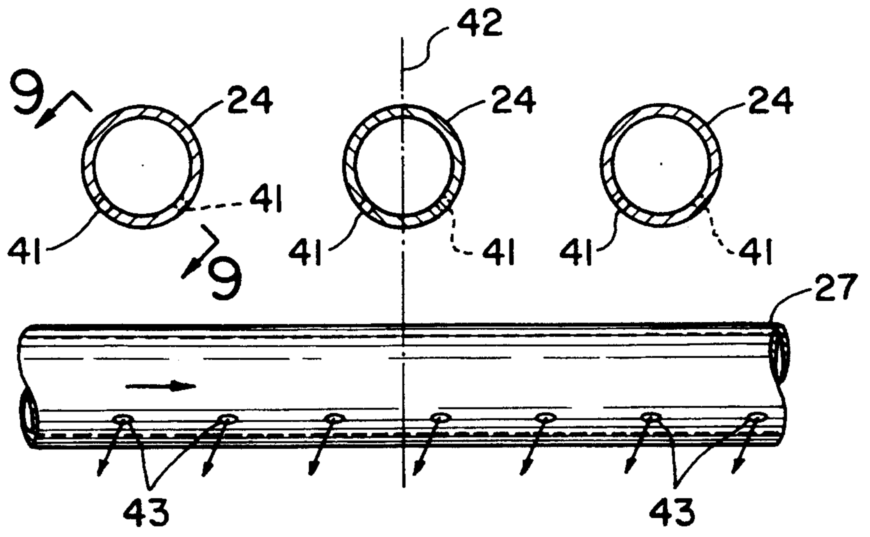
FIG. 8 is a sectional view taken along line 8—8 of FIG. 6.

If one looks at FIG. 7 it will be clear that when air is delivered through tuyeres 24 in sufficient quantity to fluidize bed 15 only that part of the bed above the level shown by reference line 44 will be fluidized, and that part of the bed below the reference line will remain static. Thus, any agglomerates that form in the fluidized part of the bed and that cannot be sustained in the fluid motion of the bed will sink towards the level indicated by reference line 44. They cannot sink into the static part of the bed. Moreover, because of the directional aspect of the fluidizing jets of air issuing from the air holes in tuyeres 24, the agglomerates that do settle to the top of the static part of bed 15 will be blown or moved towards the centerline of the incinerator to the area above and between tuyeres 27. The effect of the jets of air for moving the oversized inerts, i.e., the agglomerates, is accentuated because the directional aspect of the air flow is concentrated in the gaps between the tuyeres and not diffused over the whole cross section of the bed.

If air is then delivered to tuyeres 27, the part of bed 15 between tuyeres will be fluidized and the agglomerates that were blown to the centerline of the incinerator by tuyeres 24 will now settle to the bottom of fluidized bed between tuyeres 27, and because of the directional aspect of the jets of fluidizing air issuing from tuyeres 27 the agglomerates will be blown or moved towards discharge port 30 where agglomerates and bed particles will be removed from vessel 11 by gravity. Air can be delivered to tuyeres 27 periodically if agglomerates form at a slow rate and need to be removed intermittently, or it may be delivered continuously if the rate of agglomerate formation so requires.

Having thus described the invention it is to be understood that many apparently widely different embodiments thereof may be envisioned without departing from the spirit and scope of the invention. For example, the invention may be used in fluid bed reactors, other than incinerators, in which agglomerates, clinkers, gangue, tramp material, inerts, or non-combustibles are to be removed from the fluidized bed on a periodic or continuous basis. When the term agglomerates was used in this specification it was intended to include all these types of material. Therefore, it is intended that the foregoing specification and the accompanying drawing be interpreted as illustrative and not in a limiting sense.

What is claimed is:

1. A fluidized bed reactor comprising a reactor vessel having a floor and a gas distribution system for fluidizing a particulate bed in said reactor vessel and for removing non-fluidizable particles that may be introduced into or formed in the bed through a discharge port provided in the floor of the vessel below the bed, said system comprising a plurality of parallel horizontal gas inlet pipes located a distance above the floor of the reactor vessel and arranged in a side by side spaced-apart relationship across the reactor vessel, each of said gas inlet pipes being provided with a longitudinal series of gas outlet ports for introducing a fluidizing gas into a particulate bed which extends from the floor of the vessel to a level above said gas inlet pipes to fluidize at least that portion of the bed above said gas inlet pipes, said gas outlet ports having a directional orientation such that the gas emanating from each port is directed towards a horizontal center line of the vessel that is transverse to the longitudinal length of said pipes, a pair of spaced-apart parallel horizontal gas inlet pipes located between the floor of the reactor vessel and the aforesaid plurality of gas inlet pipes, said pair of pipes being arranged transverse to said plurality of gas inlet pipes and parallel with the aforesaid center line of the reactor vessel with the discharge port located between said pair of gas inlet pipes, each pipe of said pair of gas inlet pipes being provided with a longitudinal series of gas outlet ports for introducing a fluidizing gas into the particulate bed to fluidize that part of the bed that lays between said pair of pipes, each of said gas outlet ports in said pair of gas inlet pipes having a directional orientation such that the gas emanating from each port is directed towards the discharge port provided in the vessel floor, the arrangement being such that agglomerates or particles that are not sustainable in a fluidized state by the gas from the plurality of gas inlet pipes settle to the bottom of that part of the bed fluidized by said plurality of gas inlet pipes adjacent the aforesaid centerline of the reactor vessel and then to the bottom of that part of the bed fluidized by the gas from said pair of gas inlet pipes where they are moved towards the discharge port by the directionally oriented fluidizing gas emanating from said pair of pipes.

2. A gas distribution system according to claim 1 wherein the longitudinal series of gas outlet ports in each of said plurality of gas inlet pipes comprises two longitudinal rows of gas outlet ports located near the bottom of the pipe but on opposite sides of a vertical central plane passing longitudinally through the each of said gas inlet pipes.

3. A gas distribution system according to claim 1 wherein the longitudinal series of gas outlet ports in each of said pair of gas inlet pipes comprises a single row of gas outlet ports located near the bottom of the pipe and on the side of a vertical central plane passing longitudinally through the pipe nearest the other of said pair of pipes.

4. A gas distribution system according to claim 1 wherein each of said plurality of gas inlet pipes extends from a gas manifold external to the reactor vessel through the reactor wall, across the interior of the vessel, and through the wall on an opposite side of the vessel, and including means for supporting the ends of the plurality of gas inlet pipes remote from the gas manifold for sliding motion to accommodate thermal expansion and contraction of the plurality of pipes.

5. A gas distribution system according to claim 4 wherein the means for supporting the remote ends of the plurality of gas inlet pipes include a sleeve member for each pipe into which the end of the pipe of said plurality extends.

6. A gas distribution system according to claim 5 wherein the end of each sleeve member is closed, and including a gas inlet in each sleeve member through which a purge gas can be introduced into each sleeve member to keep each member free of particles that might otherwise seep into each sleeve member from the particulate bed.

* * * * *